(12) United States Patent
Zhu et al.

(10) Patent No.: US 12,522,460 B2
(45) Date of Patent: Jan. 13, 2026

(54) WINDING MANDREL MECHANISM AND WINDING MACHINE

(71) Applicant: WUXI LEAD INTELLIGENT EQUIPMENT CO., LTD., Jiangsu (CN)

(72) Inventors: Aiwu Zhu, Jiangsu (CN); Fengjie Wang, Jiangsu (CN); Liujie Zhao, Jiangsu (CN)

(73) Assignee: WUXI LEAD INTELLIGENT EQUIPMENT CO., LTD., Wuxi (CN)

( * ) Notice: Subject to any disclaimer, the term of this patent is extended or adjusted under 35 U.S.C. 154(b) by 379 days.

(21) Appl. No.: 18/121,003

(22) Filed: Mar. 14, 2023

(65) Prior Publication Data

US 2023/0211970 A1   Jul. 6, 2023

Related U.S. Application Data

(63) Continuation of application No. PCT/CN2021/133385, filed on Nov. 26, 2021.

(30) Foreign Application Priority Data

Nov. 5, 2021   (CN) .......................... 202122706043.X (51) Int. Cl.
  *B65H 18/10*   (2006.01)
  *B65H 27/00*   (2006.01)
  *H01M 10/04*   (2006.01)

(52) U.S. Cl.
  CPC ............ *B65H 18/10* (2013.01); *B65H 27/00* (2013.01); *B65H 2404/72* (2013.01); *B65H 2404/741* (2013.01); *H01M 10/0409* (2013.01)

(58) Field of Classification Search
  CPC .... B65H 18/10; B65H 27/00; B65H 2404/72; B65H 2404/741; B65H 18/026;

(Continued)

(56) References Cited

U.S. PATENT DOCUMENTS 2,097,287 A * 10/1937 Mckenna ........... B65H 75/2484
                                                      242/573.2
3,357,710 A * 12/1967 Buck .................... B23B 31/4033
                                                      279/145

(Continued)

FOREIGN PATENT DOCUMENTS

CN   109980298 A   7/2019
CN   111725570 A   9/2020

(Continued)

OTHER PUBLICATIONS

European Extended Search Report issued in corresponding European Patent Application No. 21956967.0 dated Apr. 8, 2024.

(Continued)

*Primary Examiner* — Anna M Momper
(74) *Attorney, Agent, or Firm* — PV IP PC; Wei Te Chung (57) ABSTRACT

A winding mandrel mechanism and a winding machine are provided. The winding mandrel mechanism includes a winding pin holder, two half winding pin assemblies, and a driving rod. Each half winding assembly includes an outer pin and an inner clip mounted to the winding pin holder and movable along a radial direction of the winding mandrel mechanism. The driving rod is advanced axially, and inner clips are driven by second cam structures to move radially until clamping material to be wound. The winding mandrel mechanism is rotated to wind the clamped material around outer periphery of the winding mandrel mechanism. To adjust a circumference of the winding mandrel mechanism, the driving rod is advanced continuously along the axial direction of the winding mandrel mechanism, and outer pins are driven to move radially away by first cam structures, thereby increasing the circumference of the outer pins.

20 Claims, 3 Drawing Sheets

(58) Field of Classification Search
CPC .. B65H 75/2484; B65H 75/28; B65H 75/242; B65H 75/248
USPC ............... 279/2.04, 2.1, 2.11, 2.13, 2.15
See application file for complete search history.

(56) References Cited

U.S. PATENT DOCUMENTS

| | | | |
|---|---|---|---|
| 6,494,401 B2* | 12/2002 | Bradshaw | B65H 75/243 |
| | | | 242/573.7 |
| 7,748,718 B2* | 7/2010 | Brettell | B23B 31/4046 |
| | | | 279/2.13 |
| 9,873,144 B2* | 1/2018 | Ostheimer | B21B 1/22 |
| 2003/0183360 A1 | 10/2003 | Ratte | |
| 2007/0231679 A1 | 10/2007 | Chang et al. | |

FOREIGN PATENT DOCUMENTS

| | | | | |
|---|---|---|---|---|
| CN | 213459849 U | * | 6/2021 | ........ H01M 10/0409 |
| CN | 113241471 A | | 8/2021 | |
| CN | 113659217 A | | 11/2021 | |
| KR | 20070097855 A | | 5/2007 | |
| KR | 101679541 B1 | * | 11/2016 | ............. B65H 75/04 |

OTHER PUBLICATIONS

International Search Report in International application No. PCT/CN2021/133385,mailed on Nov. 26, 2021.
Written Opinion of the International Search Authority in International application No. PCT/CN2021/133385,mailed on Nov. 26, 2021.

* cited by examiner

FIG. 5

WINDING MANDREL MECHANISM AND WINDING MACHINE

CROSS-REFERENCE TO RELATED APPLICATIONS

This application is a continuation of International Application No. PCT/CN2021/133385, filed Nov. 26, 2021, titled "WINDING MANDREL MECHANISM AND WINDING MACHINE", which claims priority to Chinese Patent Application No. 202122706043.X, filed Nov. 5, 2021, titled "WINDING MANDREL MECHANISM AND WINDING MACHINE". The disclosures of the aforementioned applications are hereby incorporated by reference in their entireties.

TECHNICAL FIELD

The present disclosure relates a technical field of battery manufacture, and more particularly, to a winding mandrel mechanism and a winding machine.

BACKGROUND

During manufacture of a battery cell, it is often necessary to use a winding machine to wind material such as a pole piece, a separator, or the like to form the cell. A winding mandrel mechanism is a core member of the winding machine to clamp the material and wind the same around the outer periphery by rotation. In practical production, in order to adopt cells with different types, it is also necessary to adjust a radial dimension of the winding mandrel mechanism to vary a circumference of the winding mandrel mechanism. However, a conventional winding mandrel mechanism is often provided with a plurality of sets of driving and transmitting structures to change the circumference, resulting in a complex structure.

SUMMARY

A winding mandrel mechanism and a winding machine are provided accordingly, which are simple in structure and capable of adjusting the circumference.

A winding mandrel mechanism, including:

a winding pin holder;

two half winding pin assemblies disposed oppositely, wherein each of the two half winding pin assemblies includes an outer pin and an inner clip, and the outer pin and the inner clip are mounted to the winding pin holder and movable along a radial direction of the winding mandrel mechanism; and a driving rod provided between the outer pin and the inner clip, wherein the driving rod is reciprocally movable along an axial direction of the winding mandrel mechanism, a side of the driving rod towards the outer pin cooperates with the outer pin to define a first cam structure, and a side of the driving rod towards the inner clip cooperates with the inner clip to define a second cam structure;

wherein the driving rod is advanced along the axial direction of the winding mandrel mechanism, the outer pin is driven to move away from an axis of the winding mandrel mechanism along the radial direction of the winding mandrel mechanism by the first cam structure, and the inner clip is driven to move close to the axis of the winding mandrel mechanism along the radial direction of the winding mandrel mechanism by the second cam structure.

In an embodiment, a guide rod is provided on the winding pin holder and is extended along the radial direction of the winding mandrel mechanism, an end of the outer pin is provided with a guide sleeve, and the guide sleeve is slidably sleeved on the guide rod.

In an embodiment, each of the two half winding pin assemblies further includes a first elastic member for providing an elastic force to the outer pin, the outer pin is driven by the first elastic member to move close to the axis of the winding mandrel mechanism along the radial direction of the winding mandrel mechanism.

In an embodiment, a spring pressing plate is fixedly provided on the winding pin holder, the first elastic member is a first spring sandwiched between the spring pressing plate and the outer pin, and the first spring drives the outer pin to move close to the axis of the winding mandrel mechanism along the radial direction of the winding mandrel mechanism.

In an embodiment, each of the two half winding pin assemblies further includes an inner pin housing fixed to the winding pin holder, an accommodating groove is provided on a side of the inner pin housing away from the outer pin, and the inner clip is accommodated in the accommodating groove and movable along the radial direction of the winding mandrel mechanism.

In an embodiment, a pressing block is provided at two ends of the accommodating groove, each of two ends of the inner clip is limited between the pressing block and a bottom of the accommodating groove, a second elastic member is sandwiched between the pressing block and the inner clip, and the second elastic member drives the inner clip to move away from the axis of the winding mandrel mechanism along the radial direction of the winding mandrel mechanism.

In an embodiment, a limiting post is fixedly provided at an end of the inner pin housing away from the winding pin holder, the limiting post is extended along the radial direction of the winding mandrel mechanism and through the outer pin, a limiting portion is provided at an end of the limiting post away from the inner pin housing, and the outer pin is movable along the radial direction of the winding mandrel mechanism to abut against the limiting portion.

In an embodiment, each of the two half winding pin assemblies further includes a third elastic member sleeved on the limiting post and sandwiched between the limiting portion and the outer pin, and the third elastic member drives the outer pin to move close to the axis of the winding mandrel mechanism along the radial direction of the winding mandrel mechanism.

In an embodiment, a fourth elastic member is provided between the driving rod and the winding pin holder, the fourth elastic member is configured to provide an elastic force to the driving rod to retract the driving rod along the axial direction of the winding mandrel mechanism.

In an embodiment, a first driving surface is provided on a side of the driving rod towards the outer pin, a first roller is provided on the outer pin, and the first roller is in a rolling engagement with the first driving surface to define the first cam structure, wherein a second driving surface is provided on a side of the driving rod towards the inner clip, a second roller is provided on the inner clip, and the second roller is in a rolling engagement with the second driving surface to define the second cam structure.

In an embodiment, the first driving surface includes a first inclined section and a first planar section, the first inclined section intersects the axial direction of the winding mandrel mechanism obliquely, the first planar section extends along the axial direction of the winding mandrel mechanism, and the driving rod is advanced along the axial direction of the winding mandrel mechanism to allow the first roller sequentially to pass through the first inclined section and the first planar section;

the second driving surface includes a second inclined section and a second planar section, the second inclined section intersects the axial direction of the winding mandrel mechanism obliquely, the second planar section extends along the axial direction of the winding mandrel mechanism, the driving rod is advanced along the axial direction of the winding mandrel mechanism to allow the second roller sequentially to pass through the second inclined section and the second planar section, and two inner clips abut when the second roller rolls to the second planar section.

In an embodiment, the first roller is located in the first inclined section when the second roller enters the second planar section as the driving rod is advanced along the axial direction of the winding mandrel mechanism.

In an embodiment, the winding mandrel mechanism includes a pushing plate slidably mounted to the winding pin holder along the axial direction of the winding mandrel mechanism, wherein the pushing plate is provided with a pawl connected with the driving rod, the pushing plate is operated to drive the pawl to move the driving rod retreat along the axial direction of the outer pin.

A winding machine, including:
a winding mandrel mechanism of any one of the above embodiments;
a driving mechanism driving the winding mandrel mechanism to rotate in an axial direction; and
an adjusting mechanism driving the driving rod to advance along the axial direction of the winding mandrel mechanism to adjust a circumference of the outer pins.

A winding mandrel mechanism and a winding machine are provided. The driving rod is advanced axially, and inner clips are driven by a second cam structure to move radially until clamping material to be wound. The winding mandrel mechanism is rotated to wind the clamped material around outer periphery of the winding mandrel mechanism. To adjust a circumference of the winding mandrel mechanism, i.e., a circumference of the outer pins, the driving rod is advanced continuously along the axial direction of the winding mandrel mechanism, and the outer pins are driven to move radially away by a first cam structure, thereby increasing the circumference of the outer pins. The clamping of the material and the adjustment of the circumference of the outer pins are achieved by moving the driving rod. Therefore, the structure of the winding mandrel mechanism and the winding machine are greatly simplified.

BRIEF DESCRIPTION OF THE DRAWINGS

In order to make the embodiments of the present disclosure or the technical solutions in the prior art more clearly, reference will now be made to the accompanying drawings used in the description of the embodiments or the prior art, and it will be apparent that the accompanying drawings in the description below are merely some of the embodiments of the present disclosure, and other drawings may be made to those skilled in the art without any inventive effort.

DETAILED DESCRIPTION OF THE EMBODIMENTS

In order that the above objects, features and advantages of the present disclosure may be more readily understood, reference will now be made in detail to the accompanying drawings. In the following description, numerous specific details are set forth in order to facilitate a thorough understanding of the present disclosure. However, the present disclosure can be practiced in many other ways than those described herein, and those skilled in the art can make similar modifications without departing from the spirit of the present disclosure, and thus the present disclosure is not limited to the specific embodiments disclosed below.

In the description of this disclosure, it should be understood that the azimuth or positional relationship indicated by the terms "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential", and the like, is based on the azimuth or positional relationship shown in the accompanying drawings, merely for ease of description of this disclosure and simplification of the description, and is not intended to indicate or imply that the indicated device or element must have a particular azimuth, be constructed and operated in a particular azimuth, and therefore is not to be construed as limiting of this disclosure.

Furthermore, the terms "first" and "second" are used for descriptive purposes only and are not to be construed as indicating or implying relative importance or implying the number of indicated technical features. Thus, the features with "first" and "second" indicate or imply to have at least one of these features. In the description herein, "a plurality of" means at least two, e.g., two, three, etc., unless expressly and specifically defined otherwise.

In the present disclosure, unless expressly defined and defined otherwise, terms such as "mounted", "linked", "connected", "fixed", and the like, should be understood as a border meaning, for example, may be fixedly connection, detachably connection, or a integrally connection; may be a mechanical connection or an electrical connection; may be a directly connection or an indirectly connection by means of an intermediate medium; and may be an internal communication of the two elements or interaction of the two elements, unless expressly defined otherwise. The specific meaning of the above terms in this disclosure may be understood by one of ordinary skill in the art depending on the specific circumstances.

In the present disclosure, unless expressly stated and defined otherwise, the first feature may be "on" or "under" the second feature may mean that the first feature directly contacts with the second feature or indirectly contacts with the second feature through an intermediate medium. And the first feature may be "over", "above" or "up" the second feature may mean that the first feature may be directly above or obliquely above the second feature, or merely indicate that the first feature is higher than the second feature. The first feature may be "beneath", "below" or "down" the second feature may mean that the first feature may be directly above or obliquely under the second feature, or merely indicate that the first feature is shorter than the second feature.

It should be noted that when an element is referred to as being "fixed to" or "disposed in" another element, it means that the element may be directly on another element or an intermediate element may be disposed therebetween. When an element is considered to "be connected to" another element, it means that the element may be directly connected to another element or an intermediate element may be connected therebetween. As used herein, the terms "vertical", "horizontal", "up", "down", "left", "right", and the like are used for purposes of illustration only and are not intended to be the only embodiments.

Figure 1:
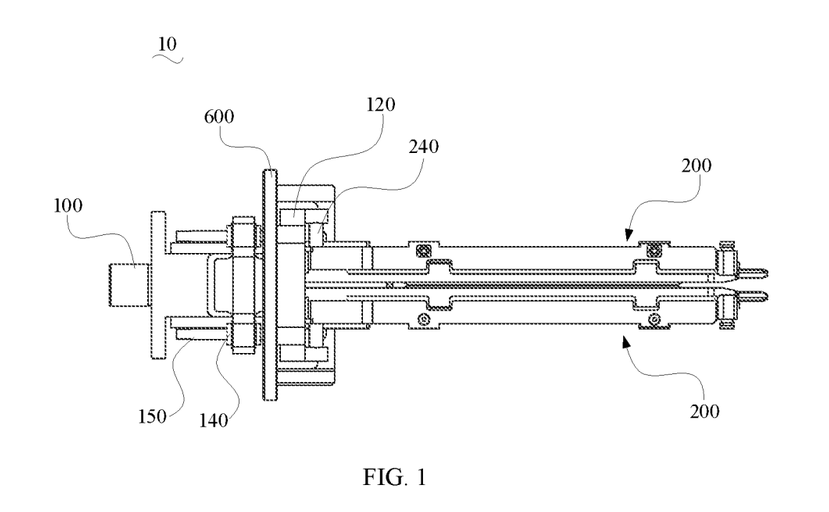
FIG. 1 is a front view of a winding mandrel mechanism according to an embodiment of the present disclosure.

Referring to FIG. 1, a winding machine and a winding mandrel mechanism 10 are provided according to the present disclosure. The winding machine includes a winding mandrel mechanism 10, a driving mechanism (not shown), and an adjusting mechanism (not shown).

The driving mechanism may be composed of a motor and a transmission structure matched with the motor. The winding mandrel mechanism 10 is generally elongated, and the driving mechanism may drive the winding mandrel mechanism 10 to rotate axially, thereby winding a strip of material around an outer periphery of the winding mandrel mechanism 10 and finally obtaining a roll of material, such as a cell. The adjusting mechanism may adjust a circumference of the winding mandrel mechanism 10 so that the winding machine can be used to produce cells of different types.

Figure 2:
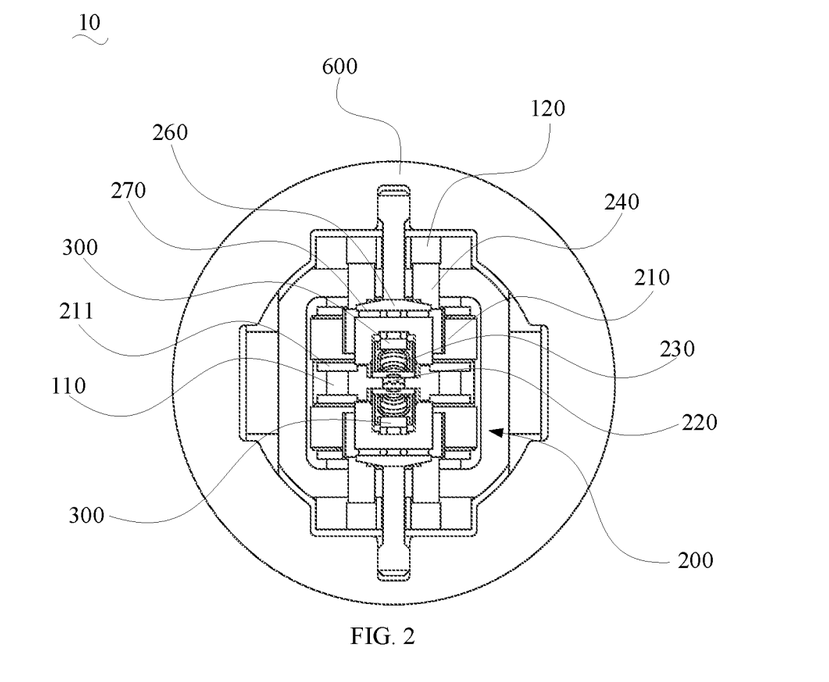
FIG. 2 is a right side view of the winding mandrel mechanism of FIG. 1.
Figure 3:
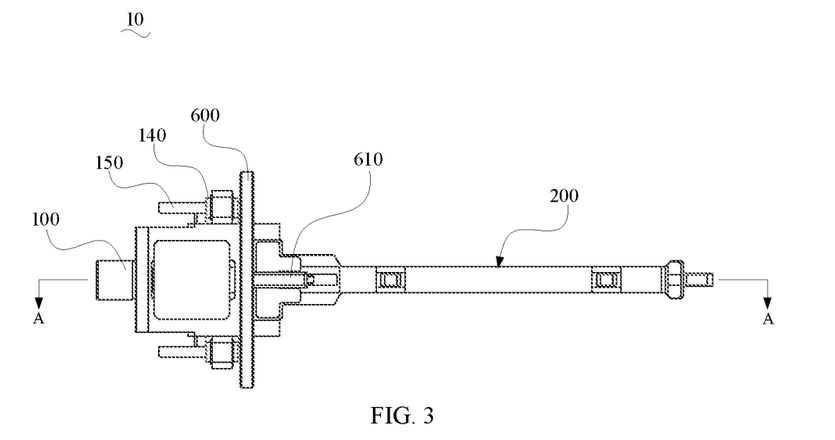
FIG. 3 is a top view of the winding mandrel mechanism of FIG. 1.

Referring to FIGS. 2 and 3, the winding mandrel mechanism 10 of the preferred embodiment of the present disclosure includes a winding pin holder 100, a half winding pin assembly 200, and a driving rod 300.

The winding pin holder 100 functions as a support, and both the half winding pin assembly 200 and the driving rod 300 are mounted on the winding pin holder 100. Two half winding pin assemblies 200 are provided, and the two half winding pin assemblies 200 are arranged oppositely. Each of the two half winding pin assemblies 200 is generally elongate and extends in an axial direction of the winding mandrel mechanism 10, i.e., extends along the left and right directions shown in FIG. 1.

Figure 4:
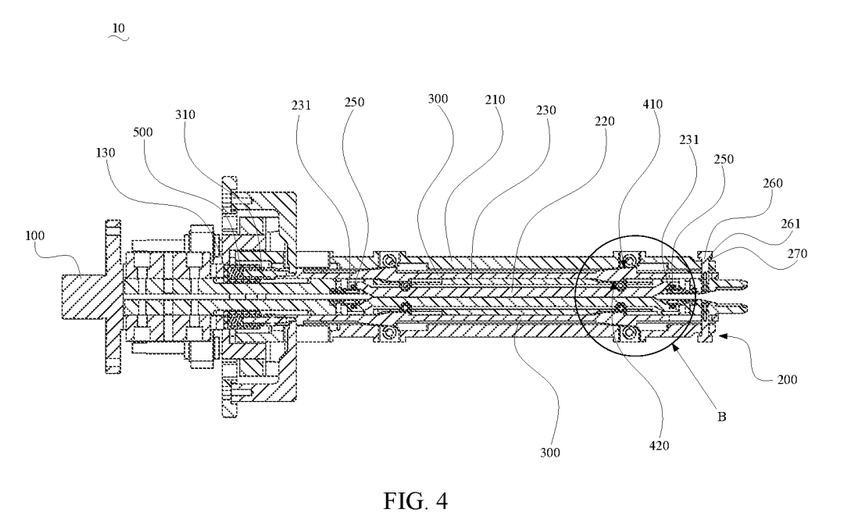
FIG. 4 is a sectional view of the winding mandrel mechanism shown of FIG. 3 taken along A-A.

Referring to FIG. 4, each half winding pin assembly 200 includes an outer pin 210 and an inner clip 220, wherein the outer pin 210 and the inner clip 220 are mounted to the winding pin holder 100 and are movable in a radial direction of the winding mandrel mechanism 10, i.e., in the up and down direction shown in FIG. 1. Both the outer pin 210 and the inner clip 220 may be elongated plate-like structures extending in the axial direction of the winding mandrel mechanism 10. In a same half winding pin assembly 200, the inner clip 220 is located in the outer pin 210, so that the inner clips 220 in the two half winding pin assemblies 200 are oppositely disposed.

In the present embodiment, the winding pin holder 100 is provided with a guide rod 110 extending in the radial direction of the winding mandrel mechanism 10, an end of each outer pin 210 is provided with a guide sleeve 211, and the guide sleeve 211 is slidably sleeved on the guide rod 110.

The guide rod 110 is disposed in a mounting cavity of the winding pin holder 100, and the guide sleeve 211 on the outer pin 210 cooperates with the guide rod 110 so that the outer pin 210 can move more smoothly along the radial direction of the winding mandrel mechanism 10. In addition, two guide rods 110 are provided on the winding pin holder 100, and two guide rods 110 are provided side by side. Further, two guide sleeves 211 are provided at the end of each outer pin 210, and two guide sleeves 211 are respectively sleeved on two guide rods 110, so that the guide rod 110 provides a more balanced support for the outer pin 210.

In the present embodiment, each half winding pin assembly 200 further includes an inner pin housing 230 fixed to the winding pin holder 100, the inner pin housing 230 is defined with an accommodating groove (not shown) on a side away from the outer pin 210, and the inner clip 220 is accommodated in the accommodating groove and movable in the radial direction of the winding mandrel mechanism 10.

The inner pin housing 230 may also have an elongated plate-like structure extending in the axial direction of the winding mandrel mechanism 10. The inner pin housings 230 of the two half winding pin assemblies 200 may be fixed to the winding pin holder 100 by a first fixing block (not shown) and a second fixing block (not shown), respectively. The inner pin housing 230 is capable of receiving and limiting the inner clip 220, and the inner pin housing 230 is capable of separating the outer pin 210 from the inner clip 220 so as to avoid interaction between the outer pin 210 and the inner clip 220 during movement.

More specifically, two ends of the accommodating groove are provided with a pressing block 231, and each of two ends of the inner clip 220 is limited between the pressing block 231 and the bottom of the accommodating groove. The pressing block 231 may be fastened to the inner pin housing 230 by screws, and a gap between the pressing block 231 and the bottom of the accommodating groove defines a range of the movement of the inner clip 220.

Further, in the present embodiment, a limiting post 260 is fixedly provided at the end of the inner pin housing 230 away from the winding pin holder 100, and the limiting post 260 extends in the radial direction of the winding mandrel mechanism 10 and extends through the outer pin 210. A limiting portion 261 is provided at the end of the limiting post 260 away from the inner pin housing 230, and the outer pin 210 is moveable in the radial direction of the winding mandrel mechanism 10 to abut the limiting portion 261.

The limiting post 260 may be fastened to the corresponding inner pin housing 230 by screws, and an end of the limiting post 260 away from the inner pin housing 230 may be provided with an annular projection to serve as the limiting portion 261. As shown in FIG. 4, two limiting posts 260 are oppositely positioned. The limiting post 260 in the upper side can prevent the outer pin 210 in the upper side from continuing to move upward, while the limiting post 260 in the lower side can prevent the outer pin 210 in the lower side from continuing to move downward. That is, the limiting post 260 can limit the range of movement of two outer pins 210 in the radial direction of the winding mandrel mechanism 10.

Moreover, the limiting post 260 and the guide rod 110 can be guided from two ends of the outer pin 210, respectively, so that the outer pin 210 is moveable in the radial direction more smoothly. In addition, the driving rod 300 is provided with an elongated avoidance hole (not shown). The avoidance hole extends in the axial direction of the winding mandrel mechanism 10 to allow the limiting post 260 to extend through and allow the limiting post 260 to slide in the axial direction.

Obviously, in other embodiments, the outer pin 210 and the inner clip 220 may also be mounted to the winding pin holder 100 by other means, such as by way of engagement of the guide rails with the slider, by way of engagement of the slide slots with the slider, and the like. The winding mandrel mechanism 10 is moveable radially.

The driving rod 300 is provided between the outer pin 210 and the inner clip 220 and is moveable reciprocally in the axial direction of the winding mandrel mechanism 10. Since two half winding pin assemblies 200 are provided, two driving rods 300 are provided and respectively arranged between the outer pin 210 and the inner clip needle 220 of each half winding pin assembly 200. The driving rod 300 is a generally elongated plate-like structure extending in the axial direction of the needle winding mandrel mechanism 10. The structure of two driving rods 300 may be identical, and in use, two driving rods 300 synchronously reciprocate along the axial direction of the winding mandrel mechanism 10.

Further, a side of the driving rod 300 close to the outer pin 210 cooperates with the outer pin 210 to define a first cam structure 410, and a side of the driving rod 300 close to the inner clip 220 cooperates with the inner clip 220 to define a second cam structure 420. Further, the driving rod 300 is advanced in the axial direction of the winding mandrel mechanism 10, and the outer pin 210 is driven to move away from an axis of the winding mandrel mechanism 10 along the radial direction of the winding mandrel mechanism 10 by the first cam structure 410, and the inner clip 220 is driven to move close to the axis of the winding mandrel mechanism 10 along the radial direction of the winding mandrel mechanism 10 by the second cam structure 420. This is, since two half winding pin assemblies 200 are provided, two outer pins 210 can be driven away from each other in the radial direction of the winding mandrel mechanism 10 by two first cam structures 410, and two inner clips 220 can be driven close to each other in the radial direction of the winding mandrel mechanism 10 by two second cam structures 420.

The driving rod 300 may be advanced to the left or right as shown in FIG. 4. Specifically, in the present embodiment, the driving rod 300 is advanced to the left, and retreated to the right. More specifically, when the driving rod 300 in the upper side is advanced to the left as shown in FIG. 4, the outer pin 210 is driven to move upward by the first cam structure 410, and the inner clip 220 is driven to move downward by the second cam structure 420. When the driving rod 300 in the lower side is advanced to the left, the outer pin 210 is driven to move downward by the first cam structure 410, and the inner clip 220 is driven to move upward by the second cam structure 420.

In order to more evenly force the outer pin 210 and the inner clip 220 when moving in the radial direction of the winding mandrel mechanism 10, each driving rod 300 may be provided with a plurality of first cam structures 410 and a plurality of second cam structures 420, respectively. As shown in FIG. 4, in the direction along which the driving rod 300 extends, two first cam structures 410 are provided between the driving rod 300 and the outer pin 210, and two second cam structures 420 are provided between driving rod 300 and the inner clip 220.

During winding of the material, two inner clips 220 may first be driven close by the second cam structures 420 to further clamp the material. The winding mandrel mechanism 10 is rotated so that the clamped material can be wound around the outer periphery of the winding mandrel mechanism 10. When it is desired to adjust the circumference of the winding mandrel mechanism 10, the adjusting mechanism may continue to advance the driving rod 300 in the axial direction of the winding mandrel mechanism 10, two outer pins 210 are driven to move radially by the first cam structures 410, and two outer pins 210 are driven to separate away from each other to increase the circumference of two outer pins 210.

After the material is wound into cell, the driving rod 300 may first be retracted in the axial direction of the winding mandrel mechanism 10. Next, two outer pins 210 are moved close to each other to reduce the circumference of the winding mandrel mechanism 10. In this way, it is advantageous to pull the winding mandrel mechanism 10 away from the wound cell without stripping the separator on the inner layer of the cell to cause wrinkles and the like. Finally, two inner clips 220 are moved away from each other to release the material, and the material may be fed for cell.

Referring again to FIG. 2, in this embodiment, each half winding pin assembly 200 further includes a first elastic member 240 for providing an elastic force to the outer pin 210, thereby moving the outer pin 210 close to the axis of the winding mandrel mechanism in the radial direction of the winding mandrel mechanism 10. This is, since two half winding pin assemblies 200 are provided, two outer pins 210 are driven to move close to each other in the radial direction of the winding mandrel mechanism 10.

Two outer pins 210 are provided with two first elastic members 240 for elastic force, respectively. As shown in FIG. 2, the first elastic member 240 in the upper side applies a downward elastic force to the outer pin 210 in the upper side, and the first elastic member 240 in the lower side applies an upward elastic force to the outer pin 210 in the lower side. Thus, when the driving rod 300 is retracted in the axial direction of the winding mandrel mechanism 10, two outer pins 210 are reset under the action of two first elastic members 240, thereby reducing the circumference of the outer pins 210, i.e., the circumference of the winding mandrel mechanism 10.

Further, in the present embodiment, a spring pressing plate 120 is fixedly provided on the winding pin holder 100, and the first elastic member 240 is a first spring sandwiched between the spring pressing plate 120 and the outer pin 210. The first spring drives the outer pin 210 to move close to the axis of the winding mandrel mechanism 10 along the radial direction of the winding mandrel mechanism 10. Since two half winding pin assemblies 200 are provided, two first springs drives two outer pins 210 to move close to each other in the radial direction of the winding mandrel mechanism 10. When two outer pins 210 are driven away from each other by the first cam structures 410, two first springs are compressed. When the driving rod 300 is retracted in the axial direction of the winding mandrel mechanism 10, two first springs are reset to drive two outer pins 210 to move close to each other.

Moreover, referring again to FIG. 4, in this embodiment, each half winding pin assembly 200 further includes a third elastic member 270, wherein the third elastic 270 is sleeved on the limiting post 260 and sandwiched between the limiting portion 261 and the outer pin 210, and the third elastic member 270 drives the outer pin 210 to move close to the axis of the winding mandrel mechanism 10. Since two half winding pin assemblies 200 are provided, two third elastic member 270 drive two outer pins 210 to move close to each other in the radial direction of the winding mandrel mechanism 10.

The third elastic member 270 may be a third spring. When two outer pins 210 are driven away from each other by the first cam structures 410, two third elastic member 270 are compressed. When the driving rod 300 is retracted in the axial direction of the winding mandrel mechanism 10, two third elastic members 270 are reset, thereby driving two outer pins 210 to move close to each other. More specifically, the first spring can cooperate with the third elastic member 270 to provide an elastic force to the outer pin 210 from both ends of the outer pin 210, respectively. As shown in FIG. 4, the first spring is applied to the left end of the outer pin 210, and the third elastic member 270 is applied to the right end of the outer pin 210. Therefore, the force applied to the outer pin 210 is relatively balanced to smoothly reset the outer pin 210.

In this embodiment, each half winding pin assembly 200 further includes a second elastic member 250 for providing an elastic force to the inner clip 220, thereby driving the inner clip 220 to move away from the axis of the winding mandrel mechanism 10 in the radial direction of the winding mandrel mechanism 10. Since two half winding pin assemblies 200 are provided, two second elastic member 250 drive two inner clips 210 to move away from each other in the radial direction of the winding mandrel mechanism 10.

Two inner clips 220 are provided with an elastic force by two second elastic members 250, respectively. As shown in FIG. 4, the second elastic member 250 in the upper side applies an upward elastic force to the inner clip 220 in the upper side, and the second elastic member 250 in the lower side applies a downward elastic force to the inner clip 220 in the lower side. Thus, when the driving rod 300 is retracted in the axial direction of the winding mandrel mechanism 10, two inner clips 220 can be reset under the action of two second elastic members 250, thereby driving two inner clips 220 to move away from each other to release the clamped material.

More specifically, the second elastic member 250 may be a second spring, and the second elastic member 250 is sandwiched between pressing block 231 and the inner clip 220. Two second spring are compressed in the radial direction of the winding mandrel mechanism 10 when two inner clips 220 are moved close to each other by the second cam structures 420. When the driving rod 300 is retracted in the axial direction of the winding mandrel mechanism 10, two second springs are reset to drive two inner clips 220 to move away from each other.

It should be noted that in other embodiments, the first cam structure 410 and the second cam structure 420 may also be provided in a form capable of bidirectional driving. That is, when the driving rod 300 is retracted in the axial direction of the winding mandrel mechanism 10, two first cam structures 410 can drive two outer pins 210 to move close to each other, and two second cam structures 420 can drive two inner clips 220 to move away from each other. In this case, it is not necessary to provide the first elastic member 240, the second elastic member 250, and the third elastic member 270.

Since the winding mandrel mechanism 10 needs to be rotated continuously during use, the adjusting mechanism for pushing the driving rod 300 along the axial direction of the winding mandrel mechanism 10 generally abuts the driving rod 300 only and is not fixedly engaged. Therefore, the adjusting mechanism can only push the driving rod 300 unidirectionally, and cannot move the driving rod 300 in a reverse direction along the axial direction of the winding mandrel mechanism 10 to achieve retraction.

In order to reset the driving rod 300 smoothly, in the present embodiment, a fourth elastic member 500 is provided between the driving rod 300 and the winding pin holder 100, and the fourth elastic member 500 is used to provide an elastic force to the driving rod 300 so that the driving rod 300 is retracted in the axial direction of the winding mandrel mechanism 10.

Further, in the present embodiment, a spring guide post 310 is attached to an end of the driving rod 300, a spring sleeve 130 is provided on the winding pin holder 100, the fourth elastic member 500 is a fourth spring sleeved on the spring guide post 310, and the spring guide post 310 is inserted into the spring sleeve 130 so that the fourth spring abuts against the spring sleeve 130.

Specifically, when the driving rod 300 is advanced, the fourth spring is compresses in the axial direction of the winding mandrel mechanism 10, thereby generating a reverse elastic force. When the adjusting mechanism for pushing the driving rod 300 is retracted, the driving rod 300 can be retracted and reset under the reverse elastic force. The spring guide 310 cooperates with the spring sleeve 130 to limit and guide the direction along which the fourth spring is compressed so that the elastic force generated by the fourth spring can be more accurately directed to the axial direction of the winding mandrel mechanism 10.

Referring again to FIGS. 1 and 3, in the present embodiment, the winding mandrel mechanism 10 further includes a pushing plate 600 slidably mounted to the winding pin holder 100 in the axial direction of the winding mandrel mechanism. The pushing plate 600 is provided with a pawl 610 connected with the driving rod 300. The pawl 610 is operated to move the driving rod 300 retract in the axial direction of the winding mandrel mechanism 10.

More specifically, the winding pin holder 100 is provided with a fixing seat (not shown), a second guide sleeve 140 is provided on the fixing seat, a second guide rod 150 is slidably provided in the second guide sleeve 140, and a pushing plate 600 is provided at an end of the second guide rod 150. The pushing plate 600 is in an annular shape and is disposed around the circumferential side of the winding pin holder 100. The pawl 610 may be extended through a notch defined in the outer pin 210 and inserted into a notch of the driving rod 300. When the fourth elastic member 500 is prevented from smoothly driving the driving rod 300 retract due to a jamming condition or the like, the driving rod 300 can be driven retracted by applying a force to the pushing plate 600. This force may be provided by a pushing block disposed opposite the pushing plate 600 and a cylinder connected with the pushing block, and the pushing plate 600 may be manually operated.

Figure 5:
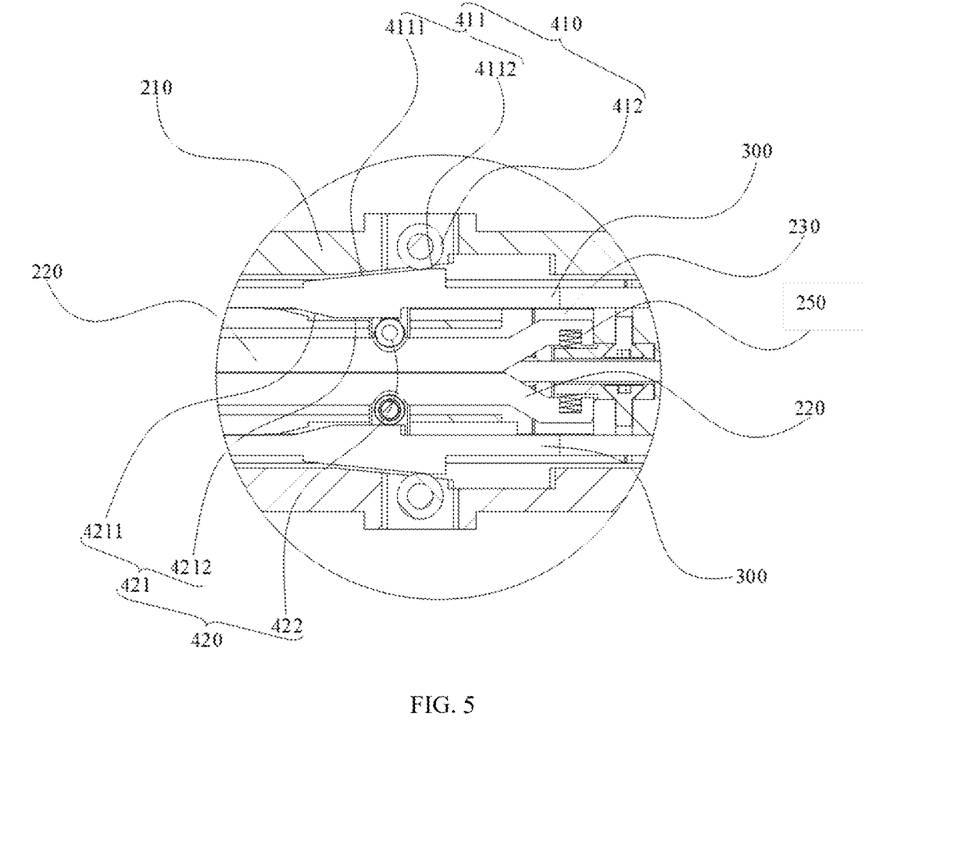
FIG. 5 is a schematic enlarged diagram of part B of the winding mandrel mechanism of FIG. 4.

Referring to FIG. 5 together with FIG. 4, in the present embodiment, a first driving surface 411 is provided on a side of the driving rod 300 towards the outward pin 210, and the outer pin 210 is provided with a first roller 412. The first roller 412 is a rolling engagement with the first driving surface 411 to define the first cam structure 410. A second driving surface 421 is provided on a side of the driving rod 300 towards the inner clip 220, and the inner clip 220 is provided with a second roller 422. The second roller 422 is in a rolling engagement with the second driving surface 421 to define the second cam structure 420.

As an example of the half winding pin assembly 200 in the upper side as shown in FIG. 4, the first driving surface 411 is provided on the upper surface of the driving rod 300, and the first roller 412 is provided on the lower surface of the outer pin 210. The second driving surface 421 is provided on the lower surface of the driving rod 300, and the second roller 422 is provided on the upper surface of the inner clip 220. The inner pin housing 230 is provided with an avoidance hole through which the second roller 422 extends.

Both the first driving surface 411 and the second driving surface 421 extend in the axial direction of the winding mandrel mechanism 10, and a height of the first driving surface 411 and a height of the second driving surface 421 tend to increase or decrease in the extending direction. Thus, when the driving rod 300 moves in the axial direction of the winding mandrel mechanism 10 and forces the first roller 412 and the second roller 422 to roll along the first driving surface 411 and the second driving surface 421, respectively, the first roller 412 moves the outer pin 210 upward in the radial direction of the winding mandrel mechanism 10 and the second roller 422 moves the inner clip 220 downward in the radial direction of the winding mandrel mechanism 10.

As shown in FIG. 4, the half winding pin assembly 200 and the driving rod 300 in the lower side are in mirror-symmetrical relationship with the half winding pin assembly 200 and the driving rod 300 in the upper side, thus, details are not described herein.

It should be noted that, in other embodiments, the positions of the first roller 412 and the first driving surface 411 are interchangeable, and the positions of the second roller 422 and the second driving surface 421 are interchangeable. Obviously, other implementations of the first cam structure 410 and the second cam structure 420 are possible. For example, the wedge block cooperates with the wedge block, and the cam cooperates with the cam plate with the cam groove.

Specifically, in the present embodiment, the first driving surface 411 includes a first inclined section 4111 and a first planar section 4112, the first inclined section 4111 intersects with the axial direction of the winding mandrel mechanism 10 obliquely, the first planar section 4112 extends along the axial direction of the winding mandrel mechanism 10, and the driving rod 300 is advanced along the axial direction of the winding mandrel mechanism 10 so that the first roller 412 sequentially passes through the first inclined section 4111 and the first planar section 4112.

Since two half winding pin assemblies 200 are provided, during the rolling of two first rollers 412 along two first inclined sections 4111, respectively, the distance between two outer pins 210 gradually increases, and the distance between two outer pins 210 reaches a maximum value when two first rollers 412 roll to two first planar sections 4112. At this time, the circumference of the outer pins 210 is maximized. After two first rollers 412 roll to two first planar sections 4112, respectively, a small movement of the driving rod 300 does not affect the distance between two outer pins 210, so that the circumference of the outer pins 210 can be kept stable. Further, two first rollers 412 can rest at any position of two first inclined section 4111, respectively, so that the circumference of the outer pins 210 can be continuously adjusted.

Obviously, in other embodiments, the first driving surface 411 may also be designed to include a plurality of horizontal segments with different heights, and two adjacent horizontal segments are connected by inclined segments. At this time, the first driving surface 411 has a stepped shape, and each horizontal section corresponds to a circumference that can be adjusted by the winding mandrel mechanism 10.

Further, the second driving surface 421 includes a second inclined section 4211 and a second planar section 4212, the second inclined section 4211 intersects the axial direction of the winding mandrel mechanism 10 obliquely, the second planar section 4212 extends along the axial direction of the winding mandrel mechanism 10, and the driving rod 300 is advanced along the axial direction of the winding mandrel mechanism 10 so that the second roller 422 sequentially passes through the second inclined section 4211 and the second planar section 4212. Since two half winding pin assemblies 200 are provided, two inner clips 220 abut when two second rollers 422 roll to two second planar sections 4212, respectively.

The second inclined section 4211 has an inclined direction opposite to the first inclined section 4111. During the rolling of two second rollers 422 along two second inclined sections 4211, respectively, the distance between two inner clips 220 is gradually reduced, and two inner clips 220 abut against each other to clamp the material when two second rollers 422 roll to two second planar sections 4212, respectively. Moreover, when two second rollers 422 are located in two second planar sections 4212, respectively, a small movement of the driving rod 300 does not affect the distance between two inner clips 220. In this way, the inner clips 220 are more statable to clamp the material during practical use.

Further, in the present embodiment, the first roller 412 is located in the first inclined section 4111 when the second roller 422 enters the second planar section 4212 as the driving rod 300 is advanced in the axial direction of the winding mandrel mechanism 10.

That is, when two second rollers 422 roll to two second planar sections 4212 respectively and two inner clips 220 abut each other, two first rollers 412 are still located at the first inclined sections 4111 respectively. At this time, it is impossible to change the distance between two inner clips 220 by continuing to advance the driving rod 300, but two outer pins 210 is moved away from each other. In practical use, the driving rod 300 may be advanced until two second rollers 422 roll to two second planar sections 4212 respectively to clamp the material by the inner clips 220. Then, the driving rod 300 is further advanced as necessary, so that the circumference of two outer pins 210 can be adjusted.

The winding mandrel mechanism 10 and the winding machine advance the driving rod 300 in the axial direction, and two inner clips 220 can be driven by two second cam structures 420 to move in the radial direction until two inner clips 220 clamp the material to be wound. The winding mandrel mechanism 10 is rotated so that the clamped material can be wound around the outer periphery of the winding mandrel mechanism 10. When it is desired to adjust the circumference of the winding mandrel mechanism 10, the driving rod 300 may continue to be advanced in the axial direction of the winding mandrel mechanism 10, and two first cam structures 410 drive two outer pins 210 to move radially away from each other, thereby increasing the circumference of two outer pins 210. It should be understood that the clamping of the material and the adjustment of the circumference of the winding mandrel mechanism 10 can be achieved by moving the driving rod 300. Therefore, the structure of the winding mandrel mechanism 10 and the winding machine can be greatly simplified.

Each of the technical features in the above-described embodiments may be combined arbitrarily. For easy description, not all possible combinations of each of the technical features in the above-described embodiments are described. However, the combinations of these technical features should be considered to be within the scope of the present description as long as they do not contradict each other.

The above-described embodiments represent only a few embodiments of the present disclosure, and are described in more detail and detail, but are not therefore to be construed as limiting the scope of the patent disclosure. It should be noted that several variations and modifications may be made by those of ordinary skill in the art without departing from the spirit and scope of the present disclosure. Accordingly, the scope of protection of the present patent should be defined by the appended claims.

What is claimed is:

1. A winding mandrel mechanism, comprising:
a winding pin holder;
a set of two half winding pin assemblies disposed oppositely, wherein each of the two half winding pin assemblies comprises an outer pin and an inner clip, and the outer pin and the inner clip are mounted to the winding pin holder and movable along a radial direction of the winding mandrel mechanism; and
a driving rod provided between the outer pin and the inner clip, wherein the driving rod is reciprocally movable along an axial direction of the winding mandrel mechanism, a side of the driving rod towards the outer pin cooperates with the outer pin to define a first cam structure, and a side of the driving rod towards the inner clip cooperates with the inner clip to define a second cam structure;
wherein the driving rod is advanced along the axial direction of the winding mandrel mechanism, the outer pin is driven to move away from an axis of the winding mandrel mechanism along the radial direction of the winding mandrel mechanism by the first cam structure, and the inner clip is driven to move close to the axis of the winding mandrel mechanism along the radial direction of the winding mandrel mechanism by the second cam structure;
wherein a guide rod is provided on the winding pin holder and is extended along the radial direction of the winding mandrel mechanism, an end of the outer pin is provided with a guide sleeve, and the guide sleeve is slidably sleeved on the guide rod.

2. The winding mandrel mechanism of claim 1, wherein each of the two half winding pin assemblies further comprises a first elastic member for providing an elastic force to the outer pin, the outer pin is driven by the first elastic member to move close to the axis of the winding mandrel mechanism along the radial direction of the winding mandrel mechanism.

3. The winding mandrel mechanism of claim 2, wherein a spring pressing plate is fixedly provided on the winding pin holder, the first elastic member is a first spring sandwiched between the spring pressing plate and the outer pin, and the first spring drives the outer pin to move close to the axis of the winding mandrel mechanism along the radial direction of the winding mandrel mechanism.

4. A winding machine, comprising:
a winding mandrel mechanism of claim 2.

5. The winding mandrel mechanism of claim 1, wherein each of the two half winding pin assemblies further comprises an inner pin housing fixed to the winding pin holder, an accommodating groove is provided on a side of the inner pin housing away from the outer pin, and the inner clip is accommodated in the accommodating groove and movable along the radial direction of the winding mandrel mechanism.

6. The winding mandrel mechanism of claim 5, wherein a pressing block is provided at two ends of the accommodating groove, each of two ends of the inner clip is limited between the pressing block and a bottom of the accommodating groove, a second elastic member is sandwiched between the pressing block and the inner clip, and the second elastic member drives the inner clip to move away from the axis of the winding mandrel mechanism along the radial direction of the winding mandrel mechanism.

7. A winding machine, comprising:
a winding mandrel mechanism of claim 6.

8. The winding mandrel mechanism of claim 5, wherein a limiting post is fixedly provided at an end of the inner pin housing away from the winding pin holder, the limiting post is extended along the radial direction of the winding mandrel mechanism and through the outer pin, a limiting portion is provided at an end of the limiting post away from the inner pin housing, and the outer pin is movable along the radial direction of the winding mandrel mechanism to abut against the limiting portion.

9. The winding mandrel mechanism of claim 8, wherein each of the two half winding pin assemblies further comprises a third elastic member sleeved on the limiting post and sandwiched between the limiting portion and the outer pin, and the third elastic member drives the outer pin to move close to the axis of the winding mandrel mechanism along the radial direction of the winding mandrel mechanism.

10. A winding machine, comprising:
a winding mandrel mechanism of claim 5.

11. The winding mandrel mechanism of claim 1, wherein a fourth elastic member is provided between the driving rod and the winding pin holder, the fourth elastic member is configured to provide an elastic force to the driving rod to retract the driving rod along the axial direction of the winding mandrel mechanism.

12. The winding mandrel mechanism of claim 1, wherein a first driving surface is provided on a side of the driving rod towards the outer pin, a first roller is provided on the outer pin, and the first roller is in a rolling engagement with the first driving surface to define the first cam structure, wherein a second driving surface is provided on a side of the driving rod towards the inner clip, a second roller is provided on the inner clip, and the second roller is in a rolling engagement with the second driving surface to define the second cam structure.

13. The winding mandrel mechanism of claim 12, wherein the first driving surface comprises a first inclined section and a first planar section, the first inclined section intersects the axial direction of the winding mandrel mechanism obliquely, the first planar section extends along the axial direction of the winding mandrel mechanism, and the driving rod is advanced along the axial direction of the winding mandrel mechanism to allow the first roller sequentially to pass through the first inclined section and the first planar section;
wherein the second driving surface comprises a second inclined section and a second planar section, the second inclined section intersects the axial direction of the winding mandrel mechanism obliquely, the second planar section extends along the axial direction of the winding mandrel mechanism, the driving rod is advanced along the axial direction of the winding mandrel mechanism to allow the second roller sequentially to pass through the second inclined section and the second planar section, and two inner clips abut when the second roller rolls to the second planar section.

14. The winding mandrel mechanism of claim 13, wherein the first roller is located in the first inclined section when the second roller enters the second planar section as the driving rod is advanced along the axial direction of the winding mandrel mechanism.

15. A winding machine, comprising:
a winding mandrel mechanism of claim 12.

16. A winding machine, comprising:
a winding mandrel mechanism of claim 13.

17. The winding mandrel mechanism of claim 1, further comprising a pushing plate slidably mounted to the winding pin holder along the axial direction of the winding mandrel mechanism, wherein the pushing plate is provided with a pawl connected with the driving rod, the pushing plate is operated to drive the pawl to move the driving rod retreat along the axial direction of the winding mandrel mechanism.

18. A winding machine, comprising:
a winding mandrel mechanism of claim 1.
19. A winding mandrel mechanism, comprising:
a winding pin holder;
a set of two half winding pin assemblies disposed oppositely, wherein each of the two half winding pin assemblies comprises an outer pin and an inner clip, and the outer pin and the inner clip are mounted to the winding pin holder and movable along a radial direction of the winding mandrel mechanism; and
a driving rod provided between the outer pin and the inner clip, wherein the driving rod is reciprocally movable along an axial direction of the winding mandrel mechanism, a side of the driving rod towards the outer pin cooperates with the outer pin to define a first cam structure, and a side of the driving rod towards the inner clip cooperates with the inner clip to define a second cam structure;
wherein the driving rod is advanced along the axial direction of the winding mandrel mechanism, the outer pin is driven to move away from an axis of the winding mandrel mechanism along the radial direction of the winding mandrel mechanism by the first cam structure, and the inner clip is driven to move close to the axis of the winding mandrel mechanism along the radial direction of the winding mandrel mechanism by the second cam structure;
wherein each of the two half winding pin assemblies further comprises a first elastic member for providing an elastic force to the outer pin, the outer pin is driven by the first elastic member to move close to the axis of the winding mandrel mechanism along the radial direction of the winding mandrel mechanism;
wherein a spring pressing plate is fixedly provided on the winding pin holder, the first elastic member is a first spring sandwiched between the spring pressing plate and the outer pin, and the first spring drives the outer pin to move close to the axis of the winding mandrel mechanism along the radial direction of the winding mandrel mechanism.
20. The winding mandrel mechanism of claim 19, wherein each of the two half winding pin assemblies further comprises an inner pin housing fixed to the winding pin holder, an accommodating groove is provided on a side of the inner pin housing away from the outer pin, and the inner clip is accommodated in the accommodating groove and movable along the radial direction of the winding mandrel mechanism.

* * * * *